United States Patent
Cho et al.

(10) Patent No.: US 11,518,436 B2
(45) Date of Patent: Dec. 6, 2022

(54) MOTOR DRIVEN POWER STEERING CONTROL METHOD AND SYSTEM

(71) Applicants: Hyundai Motor Company, Seoul (KR); Kia Motors Corporation, Seoul (KR)

(72) Inventors: Jung Eun Cho, Sejong-Si (KR); Young Min Go, Incheon (KR)

(73) Assignees: Hyundai Motor Gompany, Seoul (KR); Kia Motors Gorporation, Seoul (KR)

( * ) Notice: Subject to any disclaimer, the term of this patent is extended or adjusted under 35 U.S.C. 154(b) by 439 days.

(21) Appl. No.: 16/741,362

(22) Filed: Jan. 13, 2020

(65) Prior Publication Data

US 2021/0039710 A1 Feb. 11, 2021

(30) Foreign Application Priority Data

Aug. 9, 2019 (KR) .................. 10-2019-0097382

(51) Int. Cl.
*B62D 6/10* (2006.01)
*B62D 15/02* (2006.01)
*B62D 5/04* (2006.01)
*B62D 5/00* (2006.01)

(52) U.S. Cl.
CPC ............ *B62D 6/10* (2013.01); *B62D 5/0463* (2013.01); *B62D 15/024* (2013.01); *B62D 5/005* (2013.01)

(58) Field of Classification Search
CPC ...... B62D 6/10; B62D 5/0463; B62D 15/024; B62D 5/005
See application file for complete search history.

(56) References Cited

U.S. PATENT DOCUMENTS

| | | | |
|---|---|---|---|
| 10,974,761 B2 * | 4/2021 | Han .................. | B62D 5/0463 |
| 2006/0086560 A1 * | 4/2006 | Furusho ............. | B62D 5/0463 180/446 |
| 2008/0035411 A1 * | 2/2008 | Yamashita ............ | B62D 5/049 180/443 |
| 2020/0177113 A1 * | 6/2020 | Suzuki ............... | B62D 5/046 |

FOREIGN PATENT DOCUMENTS

| | | | | |
|---|---|---|---|---|
| CN | 105555643 A | * | 5/2016 | ........... B62D 5/0463 |
| DE | 102011017223 A1 | * | 11/2011 | ........... B62D 5/0463 |
| DE | 102012008230 A1 | * | 11/2012 | ........... B62D 5/0463 |
| KR | 10-2017-0019669 A | | 2/2017 | |

* cited by examiner

*Primary Examiner* — Jacob D Knutson
(74) *Attorney, Agent, or Firm* — Morgan, Lewis & Bockius LLP (57) ABSTRACT

A motor driven power steering control method may include setting a virtual steering system model including a column connecting a steering wheel to a rack gear, determining a column stiffness torque using torsional displacement of the column in the set virtual steering system model, and determining a target steering torque based on the determined column stiffness torque.

15 Claims, 10 Drawing Sheets

MOTOR DRIVEN POWER STEERING CONTROL METHOD AND SYSTEM

CROSS-REFERENCE TO RELATED APPLICATION

The present application claims priority to Korean Patent Application No. 10-2019-0097382, filed on Aug. 9, 2019, the entire contents of which is incorporated herein for all purposes by this reference.

BACKGROUND OF THE INVENTION

Field of the Invention

The present invention relates to a motor driven power steering control method and system including a virtual steering system model.

Description of Related Art

Conventional open loop-based motor driven power steering (MDPS) control is disadvantageous in that the performance thereof varies according to hardware dispersion and repetitive tuning is necessary to secure desired target steering performance.

However, the present open loop-based control may overcome the above drawbacks through closed loop-based feedback control.

That is, the feedback control generates a target steering torque to be controlled through a look-up table, and thus, is advantageous in that robustness in control and tuning efficiency are improved compared to the open loop-based control method.

In the case of the feedback control, it is difficult to predict the performance of control logic in an initial stage of design of a feedback controller, and thus, to improve development efficiency, a steering system using a virtual steering system model is used.

However, in the conventional steering system using the virtual steering system model, it is difficult to vary a target steering torque according to a change in a steering angle in a region having a relatively large steering angle (i.e., an off-center region).

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a virtual steering system model in which various design requirements may be reflected in a target steering torque according to a change in a steering angle in a region having a relatively large steering angle.

In accordance with an aspect of the present invention, the above and other objects may be accomplished by the provision of a motor driven power steering control method, including setting a virtual steering system model including a column connecting a steering wheel to a rack gear, determining a column stiffness torque using torsional displacement of the column as a variable in the set virtual steering system model, and determining a target steering torque based on the determined column stiffness torque.

In the setting the virtual steering system model, the column of the virtual steering system model connected to the steering wheel may be connected to the rack gear through a pinion gear, and torsional displacement of the column may occur due to rotation of the steering wheel.

In the determining the column stiffness torque, the column stiffness torque may be determined based on the torsional displacement of the column, and rates of change of the column stiffness torque with respect to the torsional displacement of the column at different amplitudes of the torsional displacement of the column may be set to be different.

The column stiffness torque may be a continuous function of the torsional displacement of the column.

In the determining the column stiffness torque, the column stiffness torque may be determined based on the torsional displacement of the column, and rates of change of the column stiffness torque with respect to the torsional displacement of the column in a plurality of sections, which are divided from each other based on amplitudes of the torsional displacement of the column, may be set to be different.

In the determining the target steering torque, the target steering torque may be determined to be proportional to a sum of the determined column stiffness torque and a column damping torque determined using a change rate of the torsional displacement of the column as a variable.

In the determining the target steering torque, an assist gain set using a speed of a vehicle as a variable may be reflected in the target steering torque.

The motor driven power steering control method may further include performing feedback control of a steering motor to track the determined target steering torque, after the determining the target steering torque.

In accordance with another aspect of the present invention, there is provided a motor driven power steering control system, including a stiffness torque determination unit configured to determine a column stiffness torque using torsional displacement of a column as a variable in a virtual steering system model including the column connecting a steering wheel to a rack gear, and a target steering torque determination unit configured to determine a target steering torque based on the determined column stiffness torque.

The stiffness torque determination unit may determine the column stiffness torque based on the torsional displacement of the column, and rates of change of the column stiffness torque with respect to the torsional displacement of the column in a plurality of sections, which are divided from each other based on amplitudes of the torsional displacement of the column, may be set to be different.

The motor driven power steering control system may further include a damping torque determination unit configured to determine a column damping torque using a change rate of the torsional displacement of the column as a variable, and the target steering torque determination unit may determine the target steering torque to be proportional to the sum of the determined column stiffness torque and the determined column damping torque.

The motor driven power steering control system may further include a gain setting unit configured to set an assist gain using a speed of a vehicle as a variable, and the target steering torque determination unit may determine the target steering torque by reflecting the assist gain set by the gain setting unit.

The motor driven power steering control system may further include a motor controller configured to control a steering motor using the target steering torque determined by the target steering torque determination unit.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other h, and the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of embodiments of the present invention set forth in the description which follows will be exemplarily provided to describe the exemplary embodiments of the present invention. However, the present invention may be embodied in many alternative forms, and may not be construed as being limited to the exemplary embodiments set forth herein.

The exemplary embodiments of the present invention may be variously modified and changed, and thus specific embodiments of the present invention will be illustrated in the drawings and described in detail in the following description of the exemplary embodiments of the present invention. However, the exemplary embodiments of the present invention are provided only to completely include the present invention and to completely inform those skilled in the art of the scope of the present invention.

In the following description of the embodiments, it will be understood that, when the terms "first", "second", etc, are used to describe various elements, these terms are not used to limit the elements. That is, these terms are used merely to distinguish the same or similar elements. Therefore, a first element may be named a second element and similarly a second element may be named a first element, within the technical scope of the present invention, unless stated otherwise.

In the following description of the embodiments, it will be understood that, when an element is "connected to", "coupled to", etc, another element, the two elements may be directly connected or coupled, or one or more other elements may be interposed between the two elements. On the other hand, and it will be understood that, when an element is "directly connected to", "directly coupled to", etc. another element, no elements may be interposed between the two elements. In the following description of the embodiments, other terms expressing relations between elements, such as "between" and "directly between" or "adjacent to" and "directly adjacent to", will be interpreted in the same manner.

It will be understood that terms used in the following description of the exemplary embodiments are used only to describe specific embodiments and are not intended to limit the present invention, and a singular expression of an element encompasses a plural expression of the element, unless stated otherwise. In the following description of the embodiments, terms "including", "having", etc. will be interpreted as indicating presence of characteristics, numbers, steps, operations, elements or parts stated in the specification or combinations thereof, and do not exclude presence of one or more characteristics, numbers, steps, operations, elements, parts or combinations thereof, or a possibility of adding the same.

It will be understood that all terms, including technical or scientific terms, used in the following description of the exemplary embodiments have the same meanings as those which are generally understood by those skilled in the art, unless defined otherwise. Also, it will be interpreted that terms defined in generally used dictionaries have meanings coinciding with contextual meanings generally, and do not have ideal or excessively formal meanings unless clearly defined.

Hereinafter, reference will be made in detail to the exemplary embodiments of the present invention, examples of which are illustrated in the accompanying drawings. In the following description of the exemplary embodiments and the drawings, the same or similar elements are denoted by the same reference numerals even when they are depicted in different drawings.

An electric power steering system which is applicable to an exemplary embodiment of the present invention is a steering system which generates steering force or supplements steering force using an electric motor, and may be a motor driven power steering (MDPS) system or a steer-by-wire (SBW) system.

Various embodiments of the present invention relate to a method and system which set a target steering torque to control a motor driven power steering system including an electric motor and then control the motor driven power steering system based on the set target steering torque.

Figure 1:
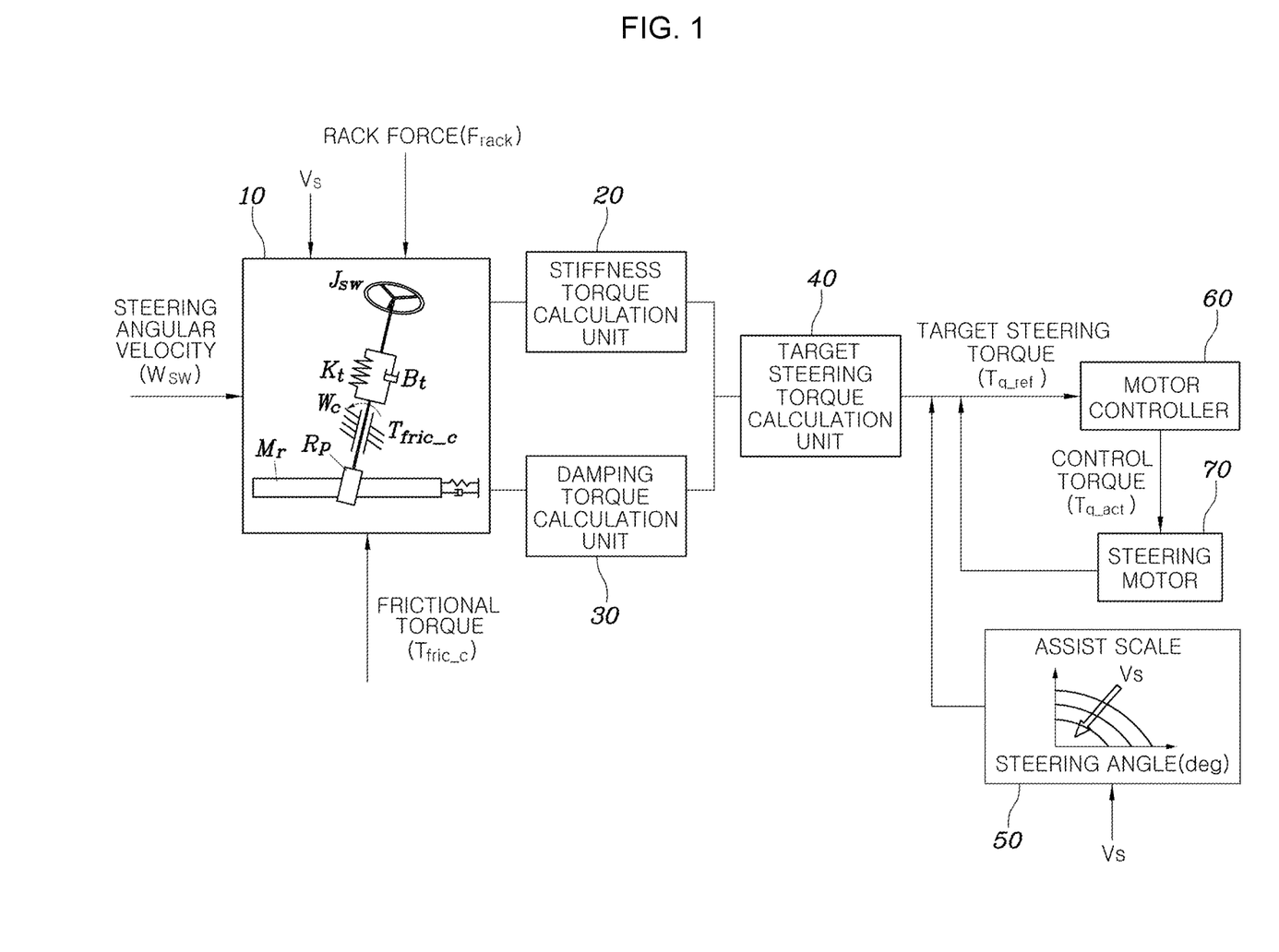
FIG. 1 is a block diagram illustrating the configuration of a motor driven power steering control system in accordance with an exemplary embodiment of the present invention.
Figure 2:
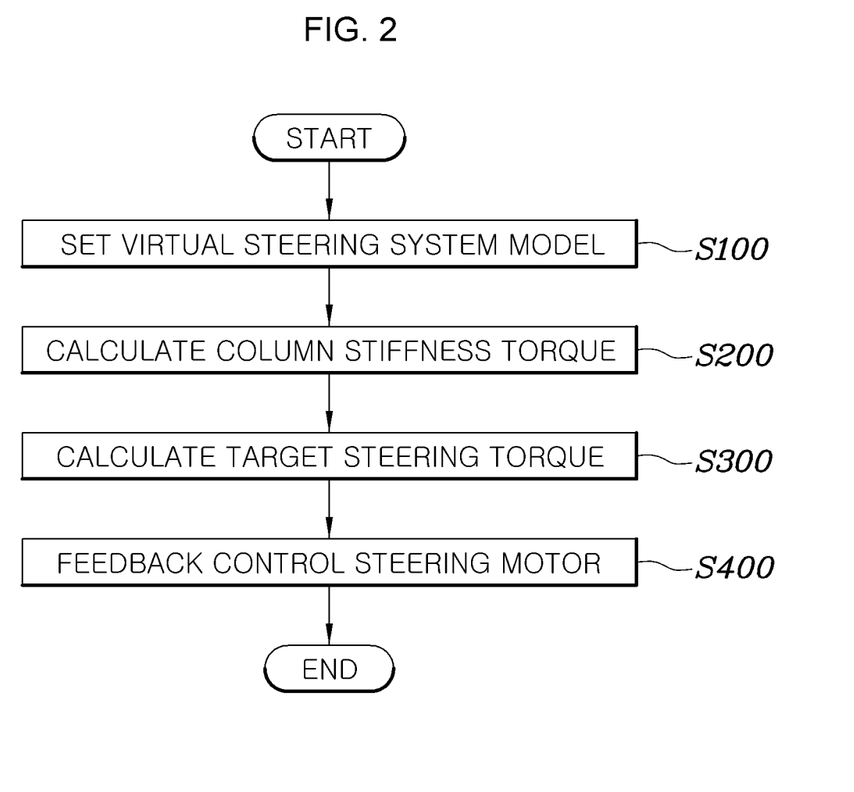
FIG. 2 is a flowchart illustrating a motor driven power steering control method in accordance with an exemplary embodiment of the present invention.
Figure 3:
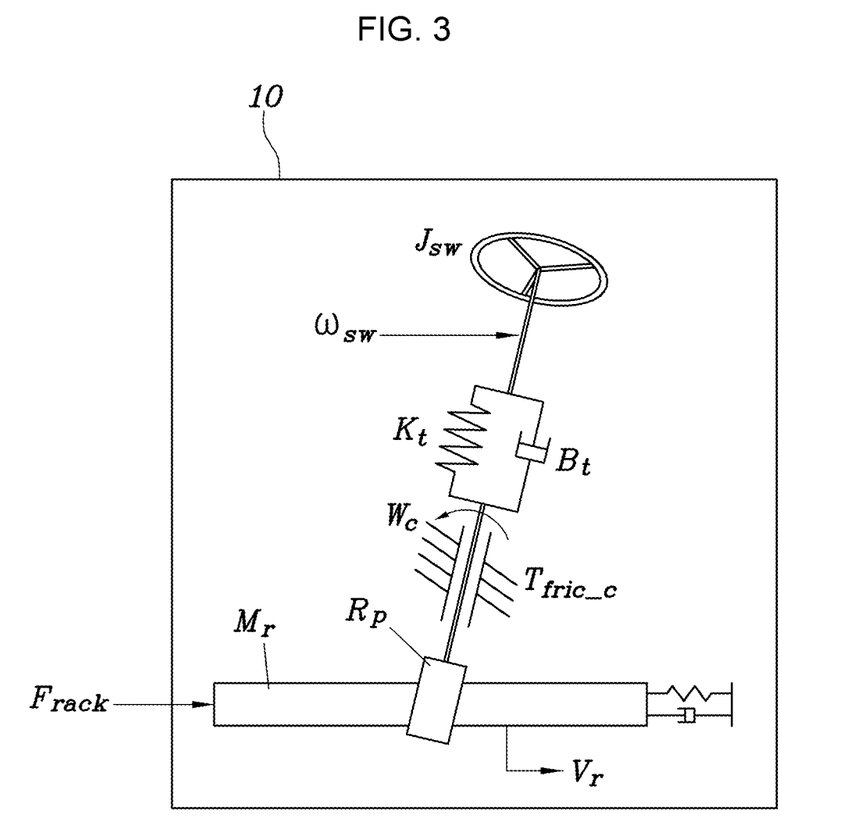
FIG. 3 is a view exemplarily illustrating a virtual steering system model in accordance with an exemplary embodiment of the present invention and FIG. 4 illustrates a bond graph for the virtual steering system model.

FIG. 1 is a block diagram illustrating the configuration of a motor driven power steering control system in accordance with an exemplary embodiment of the present invention, FIG. 2 is a flowchart illustrating a motor driven power steering control method in accordance with an exemplary embodiment of the present invention, and FIG. 3 is a view exemplarily illustrating a virtual steering system model 10 in accordance with an exemplary embodiment of the present invention.

Referring to FIG. 1, FIG. 2, and FIG. 3, the motor driven power steering control method in accordance with an exemplary embodiment of the present invention includes setting a virtual steering system model 10 including a column connecting a steering wheel to a rack gear (operation S100), determining a column stiffness torque using torsional displacement of the column as a variable in the set virtual steering system model 10 (operation S200), and determining a target steering torque based on the determined column stiffness torque (operation S300).

The virtual steering system model 10 in accordance with an exemplary embodiment of the present invention may be a Rack-type Motor Driven Power Steering (R-MDPS) system using a rack gear, and in the setting of the virtual steering system model 10 (operation S100), the column may be provided between the steering wheel and the rack gear and a pinion gear provided on the column may be connected to the rack gear.

In more detail, as shown in FIG. 3, in the setting of the virtual steering system model 10 (operation S100), the column of the virtual steering system model 10 connected to the steering wheel may be connected to the rack gear through the pinion gear, and torsional displacement of the column may occur due to rotation of the steering wheel.

By determining the target steering torque $T_{q\_ref}$ based on the virtual steering system model 10, steering performance may be predicted and thus efficiency in development of steering control technology may be raised, and characteristics of the steering system may be freely changed and thus various types of steering feel may be generated and tuning efficiency may be improved.

When the present virtual steering system model 10 is applied to an SBW system in which a mechanical connection structure between a steering wheel and a steering gear box is obviated, steering wheel reaction and steering feel as if a mechanical steering system were mounted may be realized.

In the virtual steering system model 10, a steering angular velocity $\omega_{sw}$ and a rack force $F_{rack}$ may be used as input variables, inertia $J_{sw}$ of the steering wheel, a stiffness $K_t$ of the column used as a reaction device, a damping coefficient $B_t$ of the column, a friction torque $T_{fric\_c}$ of the column, a radius $R_p$ of a pinion, and a weight $M_r$ of the rack gear may be used as system characteristic parameters, and the target steering torque $T_{q\_ref}$ may be used as an output variable depending on relations among the input variables and the system characteristic parameters. Also, We is angular velocity of the column, and Vr is velocity of the rack gear.

Figure 4:
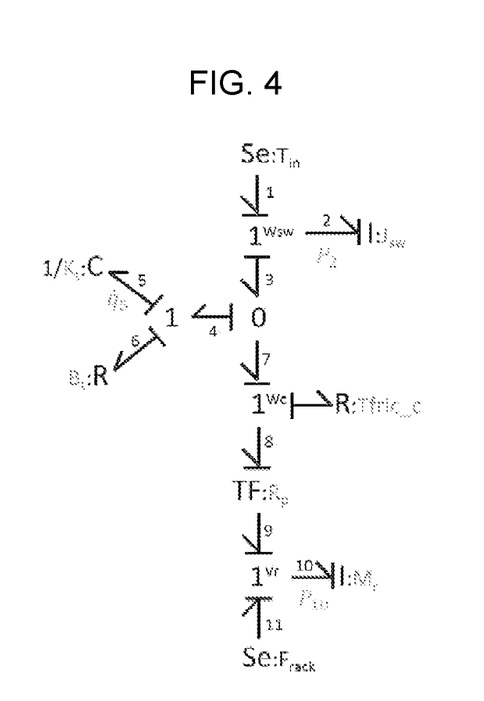

A state equation may be derived using a bond graph for the virtual steering system model 10, and the bond graph will be expressed in FIG. 4.

The state equation may be derived by setting the torsional displacement of the column, a momentum of the rack gear, a momentum of the steering wheel, and a transfer displacement of the rack gear as state variables.

In detail, the state equation may be derived using the bond graph, and in the instant case, the state equation may be derived by setting the torsional displacement $q_s$ of the column, the momentum $P_{10}$ of the rack gear, the momentum $P_2$ of the steering wheel, and the transfer displacement $q_{13}$ of the rack gear as state variables, as described below.

$$\frac{d}{dt}\begin{bmatrix} q_s \\ P_{10} \\ P_2 \\ q_{13} \end{bmatrix} = \begin{bmatrix} 0 & -\frac{1}{R_p M_r} & \frac{1}{J_{sw}} & 0 \\ \frac{K_t}{R_p} & -\frac{B_t}{R_p^2 M_r} & \frac{B_t}{R_p J_{sw}} & 0 \\ -K_t & \frac{B_t}{R_p M_r} & -\frac{B_t}{J_{sw}} & 0 \\ 0 & \frac{1}{M_r} & 0 & 0 \end{bmatrix} \begin{bmatrix} q_s \\ P_{10} \\ P_2 \\ q_{13} \end{bmatrix} +$$

$$\begin{bmatrix} 0 \\ 0 \\ 1 \\ 0 \end{bmatrix} T_{in} + \begin{bmatrix} 0 \\ 1 \\ 0 \\ 0 \end{bmatrix} F_{rack} + \begin{bmatrix} 0 \\ -\frac{1}{R_p} \\ 0 \\ 0 \end{bmatrix} T_{fric\_c} + \begin{bmatrix} 0 \\ 0 \\ -1 \\ 0 \end{bmatrix} T_{fric\_sw}$$

Here, $T_{in}$ is a steering torque input through the steering wheel, and $T_{fric\_sw}$ is a friction torque acting on the steering wheel.

In an exemplary embodiment of the present invention, the target steering torque $T_{q\_ref}$ applied to the column may be determined through numerical integration of the state equation, and the target steering torque $T_{q\_ref}$ may be determined through the following equation 1.

$$T_{q\_ref} = K_t \times q_s + B_t \times \dot{q}_s \qquad (1)$$

$T_{q\_ref}$: target steering torque
$K_t$: stiffness of column
$q_s$: torsional displacement of column
$B_t$: damping coefficient of column
$\dot{q}_s$: change rate of torsional displacement of torsion bar The torsional displacement $q_s$ of the column, which is a compliance value, may be a rotation displacement (angle), which varies in a response to the torsional stiffness of the column due to rotation of the steering wheel. It will be understood that torsional displacement $\Theta$ of the column and the torsional angle of the torsion bar which, will be described below, are the same.

That is, the target steering torque may be determined as the sum of a column stiffness torque and a column damping torque, as described in the above equation.

Figure 5:
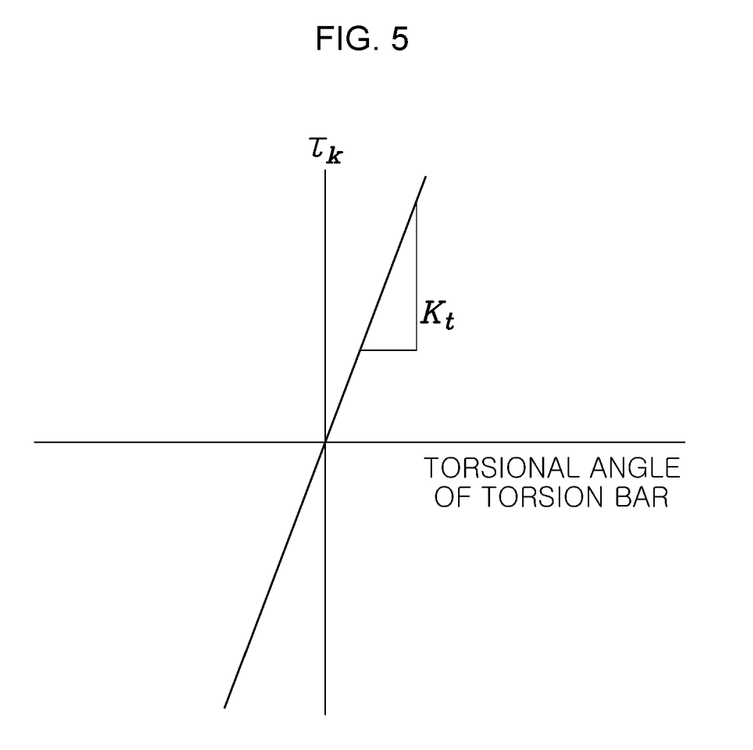
FIG. 5 is a graph illustrating a function between torsional displacement and a stiffness torque of a conventional column.
Figure 6:
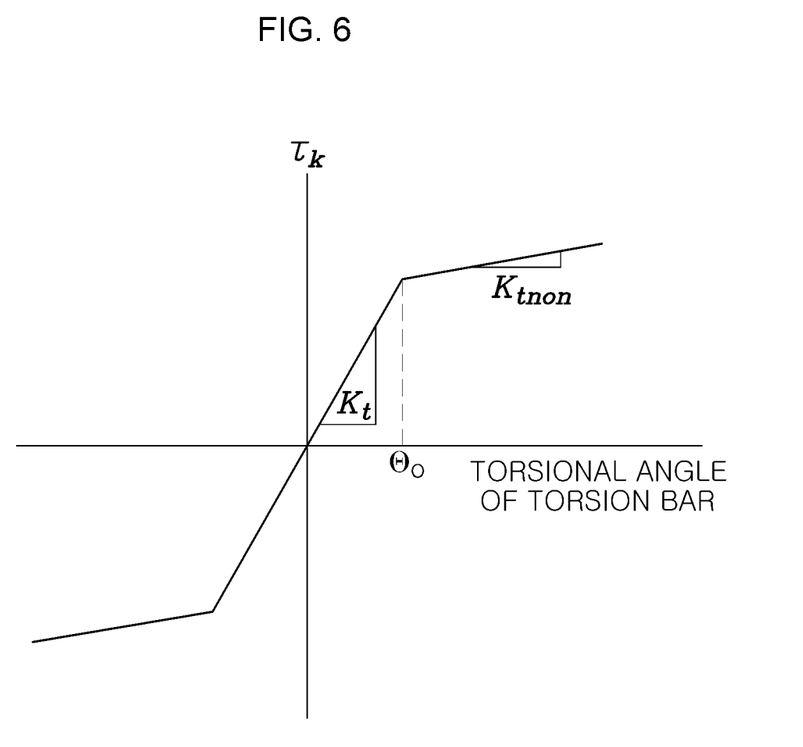
FIG. 6 is a graph illustrating a function between torsional displacement and a stiffness torque of a column in accordance with an exemplary embodiment of the present invention.

FIG. 5 is a graph illustrating a function between torsional displacement and a stiffness torque of a conventional column, and FIG. 6 is a graph illustrating a function between torsional displacement and a stiffness torque of the column in accordance with an exemplary embodiment of the present invention.

Referring to FIG. 5 and FIG. 6, in the determination of the column stiffness torque (operation S200), the column stiffness torque may be determined based on the torsional displacement of the column.

As shown in FIG. 5, a linear model of the column stiffness torque $\tau_K$ with respect to the torsional displacement of the column has been conventionally assumed. However, if the linear model of the column stiffness torque $\tau_K$ is assumed, it is difficult to vary a change rate of the target steering torque according to the steering angle in a region having a relatively large steering angle (in an off-center region).

In the determination of the column stiffness torque (operation S200) in accordance with an exemplary embodiment of the present invention, as shown in FIG. 6, a nonlinear model of the column stiffness torque $\tau_K$ with respect to the torsional displacement of the column may be set.

In more detail, rates of change of the column stiffness torque $\tau_K$ with respect to the torsional displacement of the column at different amplitudes of the torsional displacement of the column may be set to be different.

Conventionally, the column stiffness $K_t$ was set to a constant and thus used as a proportional constant of the torsional displacement of the column. However, in an exemplary embodiment of the present invention, the column stiffness corresponding to the change rate of the torsional displacement of the column may be set to vary according to the amplitude of the torsional displacement of the column.

In accordance with an exemplary embodiment of the present invention, as shown in FIG. 6, when the amplitude of the torsional displacement Θ of the column is less than a predetermined angle $\theta_0$, the column stiffness torque $\tau_K$ may be determined as being proportional to a predetermined column stiffness, as expressed in the following equation.

$$\tau_k = K_t \theta$$

Furthermore, when the amplitude of the torsional displacement Θ of the column is not less than the predetermined angle $\theta_0$, the column stiffness torque $\tau_K$ may have a change rate different from the predetermined column stiffness, as expressed in the following equation.

$$\tau_k = K_{mon}(\theta - \theta_0) + K_t \theta_0$$

That is, rates of change of the column stiffness torque $\tau_K$ with respect to the torsional displacement Θ of the column at different amplitudes of the torsional displacement Θ of the column, which are different based on the predetermined angle $\theta_0$, may be set to be different.

Furthermore, in the determination of the column stiffness torque (operation S200) in accordance with an exemplary embodiment of the present invention, rates of change of the column stiffness torque $\tau_K$ with respect to the torsional displacement Θ of the column in a plurality of sections, which are divided from each other based on the amplitudes of the torsional displacement Θ of the column, may be set to be different.

That is, rates of change of the column stiffness torque $\tau_K$ with respect to the torsional displacement Θ of the column in a section, in which the amplitude of the torsional displacement Θ of the column is less than the predetermined angle $\theta_0$, and a section, in which the amplitude of the torsional displacement Θ of the column is not less than the predetermined angle $\theta_0$, may be set to be different.

Therefore, in the off-center region having a relatively large steering angle, nonlinear characteristics of the target steering torque may be realized. Accordingly, tuning to improve the steering performance of the vehicle by the driver is possible.

The column stiffness torque $\tau_K$ may be a continuous function of the torsional displacement of the column.

Therefore, even if the torsional displacement of the column is varied, the column stiffness torque $\tau_K$ is continuously varied and a sense of difference in steering torque does not occur.

In accordance with another exemplary embodiment of the present invention, rates of change of the column stiffness torque $\tau_K$ may be different according to the torsional displacement of the column, and may be set to be differentiable in all sections.

In the determination of the target steering torque (operation S300), the target steering torque may be determined to be proportional to the sum of the determined column stiffness torque $\tau_K$ and the column damping torque $\tau_B$, determined using the change rate of the torsional displacement of the column as a variable.

The column damping torque $\tau_B$ may be determined using the change rate $\dot{q}_5$ of the torsional displacement of the column as a variable. The column damping torque $\tau_B$ may be determined as being linearly proportional to the change rate $\dot{q}_5$ of the torsional displacement of the column.

In accordance with an exemplary embodiment of the present invention, the target steering torque may be determined as the sum of the column stiffness torque $\tau_K$ and the column damping torque $\tau_B$.

In accordance with another exemplary embodiment of the present invention, in the determination of the target steering torque (operation S300), an assist gain $K_a$, set using the speed of the vehicle as a variable, may be reflected in the target steering torque.

A gain setting unit 50 may receive the speed $V_s$ of the vehicle and then set the assist gain $K_a$.

In more detail, the target steering torque $T_{q\_ref}$ may be determined by multiplying the sum of the column stiffness torque $\tau_K$ and the column damping torque $\tau_B$ by the assist gain $K_a$, and thus be configured to be changeable according to the assist gain $K_a$. It may be expressed by the following equation.

$$T_{q\_ref} = K_a(\tau_k + \tau_B)$$

Here, 0<assist gain $K_a \leq 1$

That is, if the target steering torque $T_{q\_ref}$ may be determined as an excessively high value, the target steering torque $T_{q\_ref}$ may be reduced by applying the assist gain $K_a$ thereto.

The assist gain $K_a$ may be a value which is varied according to the steering angle and the driving speed of the vehicle. In accordance with an exemplary embodiment of the present invention, the assist gain $K_a$ may be mapped in advance to be decreased as the steering angle is increased, and be mapped in advance to be decreased as the driving speed of the vehicle is increased.

The method motor driven power steering control method may further include performing feedback control of a steering motor 70 to track the determined the target steering torque $T_{q\_ref}$ (operation S400), after the determination of the target steering torque $T_{q\_ref}$ (operation S300).

That is, a motor controller 60 may perform feedback control of a control amount of the steering motor 70 so that an actual steering torque input to the steering motor 70 coincides with the target steering torque $T_{q\_ref}$.

Referring again to FIG. 1, the motor driven power steering control system in accordance with an exemplary embodiment of the present invention includes a stiffness torque determination unit 20 configured to determine a column stiffness torque using the torsional displacement of the column as a variable in the virtual steering system model including the column connecting the steering wheel to the rack gear, and a target steering torque determination unit 40 configured to determine a target steering torque based on the determined column stiffness torque.

The stiffness torque determination unit 20 may determine the column stiffness torque based on the torsional displacement of the column, and rates of change of the column stiffness torque with respect to the torsional displacement of the column in a plurality of sections, which are divided from each other based on the amplitudes of the torsional displacement of the column, may be set to be different.

The motor driven power steering control system may further include a damping torque determination unit configured to determine a column damping torque $\tau_B$ using the change rate of the torsional displacement of the column as a variable, and the target steering torque determination unit 40 may determine the target steering torque to be proportional to the sum of the column stiffness torque and the column damping torque $\tau_B$.

The motor driven power steering control system may further include the gain setting unit 50 configured to set an assist gain using the speed of the vehicle as a variable, and the target steering torque determination unit 40 may determine the target steering torque in which the assist gain set by the gain setting unit 50 is reflected.

The motor driven power steering control system may further include the motor controller 60 configured to control the steering motor 70 using the determined target steering torque.

The stiffness torque determination unit 20, the damping torque determination unit 30, the target steering torque determination unit 40, the gain setting unit 50 and the motor controller 60 in accordance with an exemplary embodiment of the present invention may correspond to portions of a controller, and the controller may be implemented through a non-volatile memory configured to store data pertaining to an algorithm configured to control operations of various elements or software instructions to implement the algorithm and a processor to perform operations, which will be described below, using the data stored in the corresponding memory.

Here, the memory and the processor may be implemented as separate chips. Alternatively, the memory and the processor may be implemented as a single integrated chip. Here, one or more processors may be provided.

Figure 7:
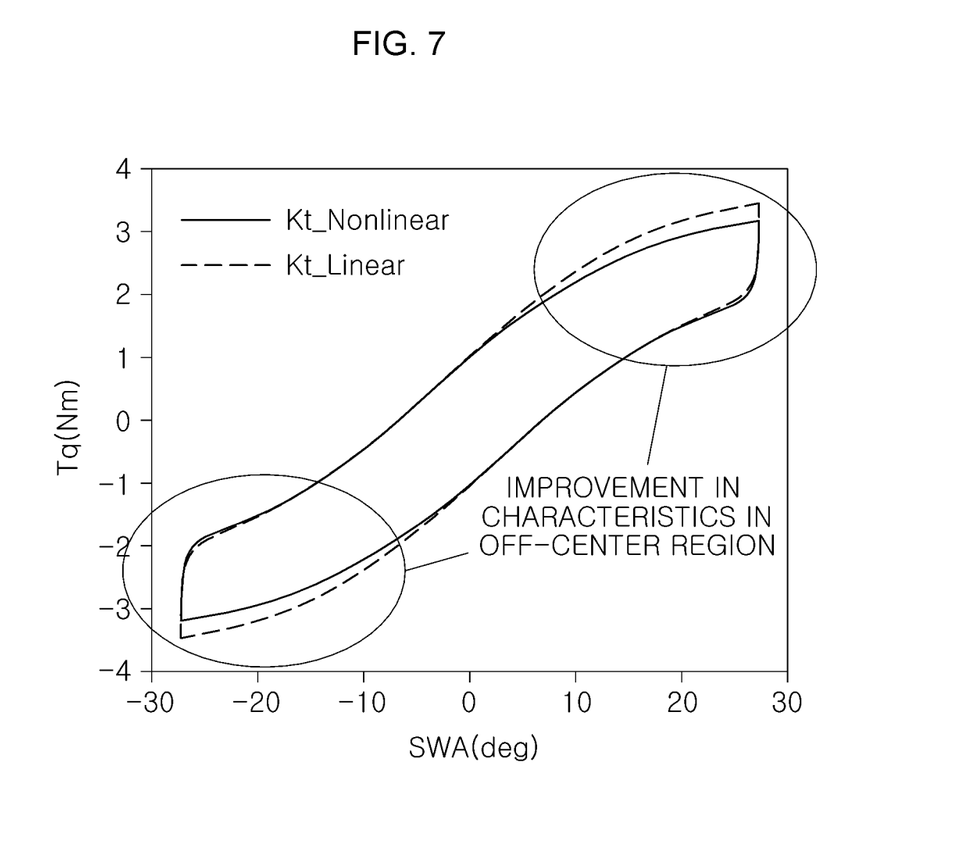
FIG. 7 and FIG. 8 are graphs illustrating model analysis results and actually measured data of the motor driven power steering control system in accordance with an exemplary embodiment of the present invention.
Figure 8:
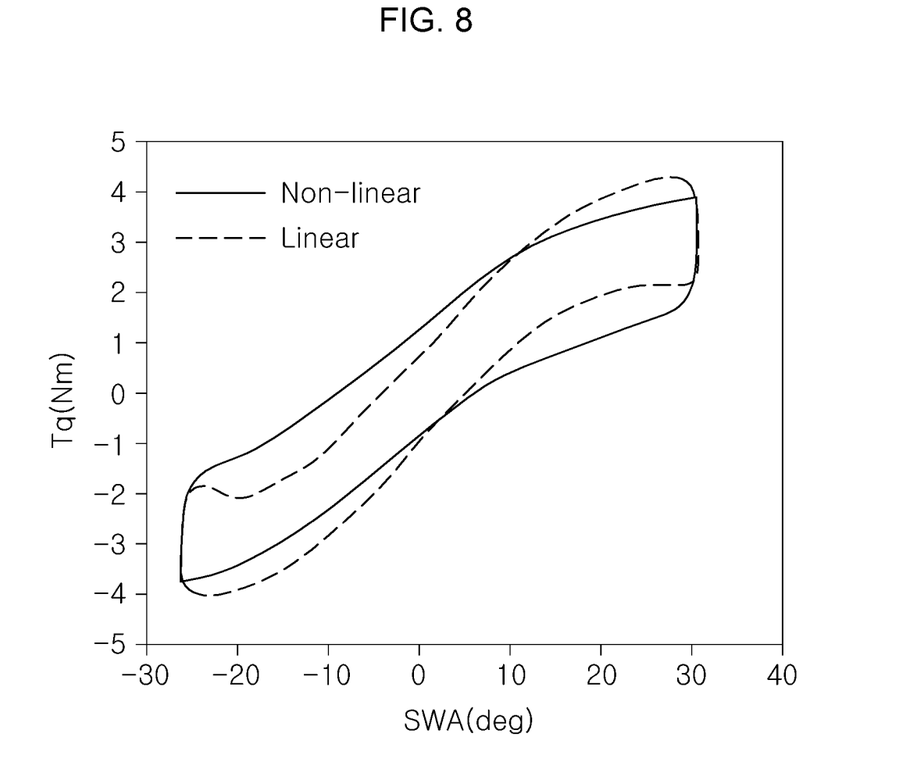

FIG. 7 and FIG. 8 are graphs illustrating model analysis results and actually measured data of the motor driven power steering control system in accordance with an exemplary embodiment of the present invention.

Referring to FIG. 7 and FIG. 8, it may be confirmed that, compared to the conventional linear function of the column stiffness torque, if a nonlinear function in accordance with an exemplary embodiment of the present invention, in which a change rate is varied according to the torsional displacement of column, is set, a steering torque in an off-center region is varied.

It may be confirmed that nonlinear characteristics of the steering torque may be realized in the off-center region, and accordingly, steering performance may be improved.

Figure 9:
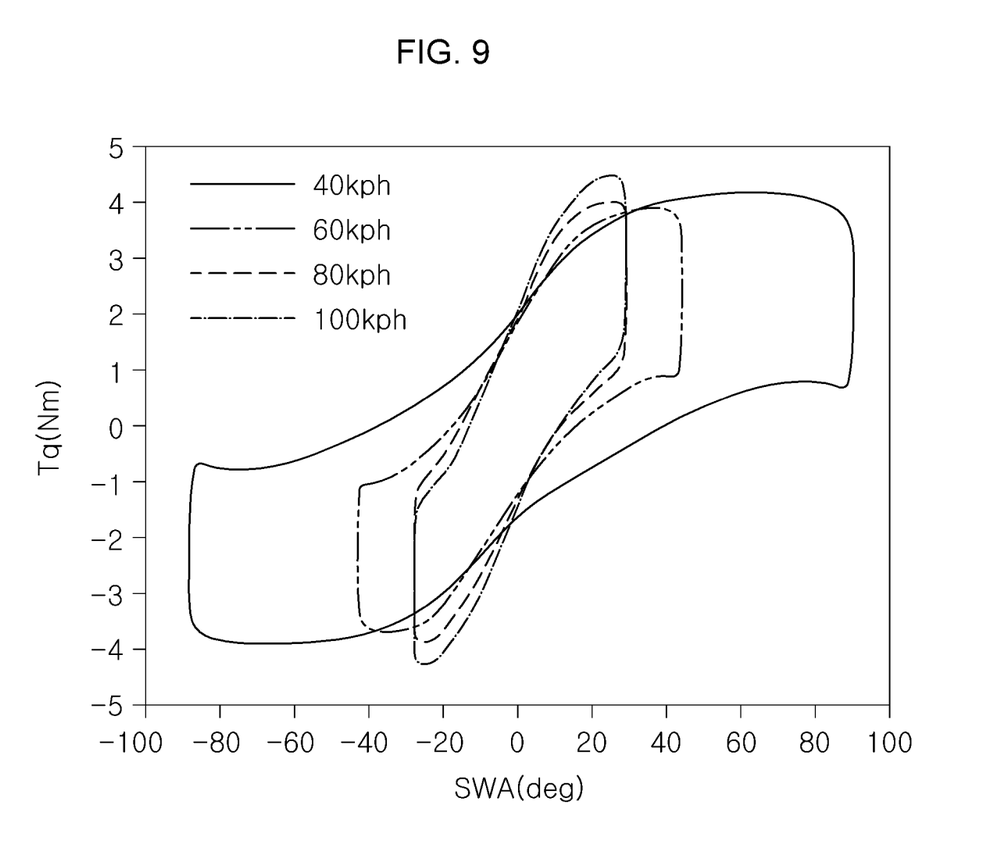
FIG. 9 is a graph illustrating real vehicle test data of a vehicle to which a conventional motor driven power steering control system is applied.
Figure 10:
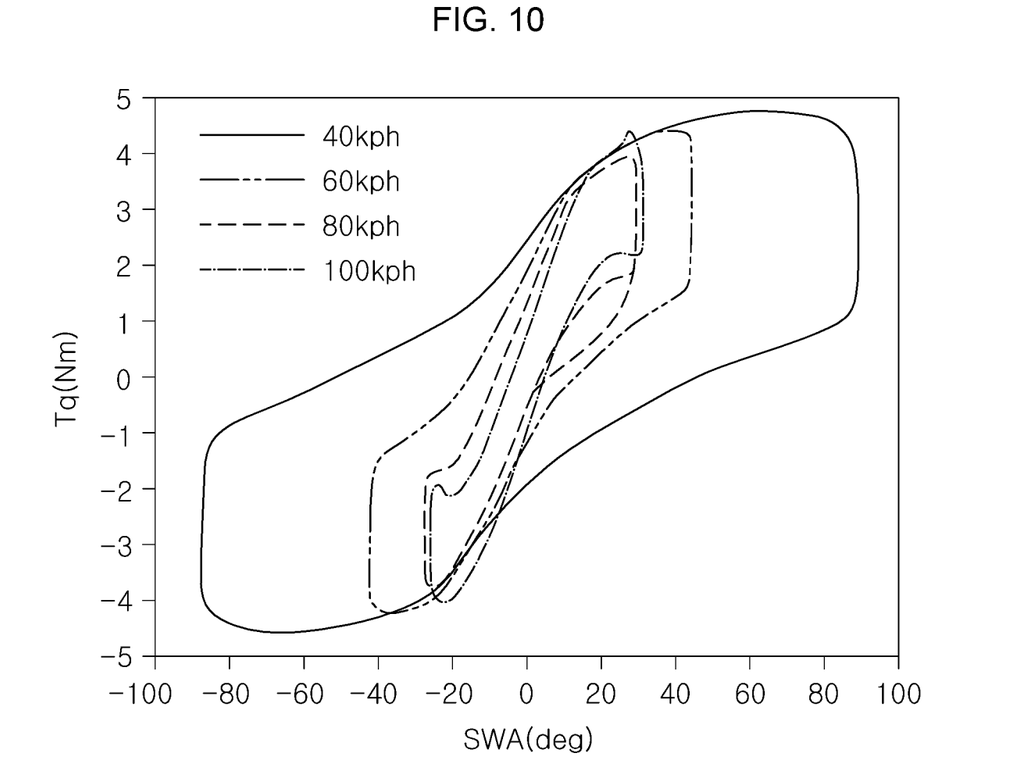
FIG. 10 is graph illustrating real vehicle test data of a vehicle to which the motor driven power steering control system in accordance with an exemplary embodiment of the present invention is applied.

FIG. 9 is a graph illustrating real vehicle test data of a vehicle to which the conventional motor driven power steering control system is applied, and FIG. 10 is graph illustrating real vehicle test data of a vehicle to which the motor driven power steering control system in accordance with an exemplary embodiment of the present invention is applied.

Referring to FIG. 9 and FIG. 10, it is demonstrated that, when a steering torque according to a steering angle at each driving speed of the vehicle is measured, nonlinear characteristics of the steering torque may be realized in the off-center region at each driving speed of the vehicle.

As is apparent from the above description, a motor driven power steering control method and system in accordance with various aspects of the present invention may implement various nonlinear characteristics of a target steering torque in an off-center region having a relatively large steering angle.

Accordingly, tuning to improve the steering performance of a vehicle by a driver is possible.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A motor-driven power steering control method comprising:
   setting, by a controller, a virtual steering system model including a model of a column connecting a steering wheel to a rack gear;
   determining, by the controller, a column stiffness torque using torsional displacement of the column as a variable in the set virtual steering system model; and
   determining, by the controller, a target steering torque based on the determined column stiffness torque,
   wherein, in the determining the column stiffness torque, the column stiffness torque is determined based on the torsional displacement of the column, and rates of change of the column stiffness torque with respect to the torsional displacement of the column in a plurality of sections, which are divided from each other based on amplitudes of the torsional displacement of the column, are set to be different.

2. The motor-driven power steering control method according to claim 1,
   wherein, in the setting the virtual steering system model, the column of the virtual steering system model connected to the steering wheel is connected to the rack gear through a pinion gear, and the torsional displacement of the column occurs due to a rotation of the steering wheel.

3. The motor-driven power steering control method according to claim 1,
   wherein, in the determining the column stiffness torque, the column stiffness torque is determined based on the torsional displacement of the column, and the rates of the change of the column stiffness torque with respect to the torsional displacement of the column at different amplitudes of the torsional displacement of the column are set to be different.

4. The motor-driven power steering control method according to claim 3, wherein the column stiffness torque is a continuous function of the torsional displacement of the column.

5. The motor-driven power steering control method according to claim 1,
wherein, in the determining the target steering torque, the target steering torque is determined to be proportional to a sum of the determined column stiffness torque and a column damping torque determined using a change rate of the torsional displacement of the column as a variable.

6. The motor-driven power steering control method according to claim 1,
wherein, in the determining the target steering torque, an assist gain set using a speed of a vehicle as a variable is reflected in the target steering torque.

7. The motor-driven power steering control method according to claim 1, further including:
performing feedback control of a steering motor to track the determined target steering torque, after the determining the target steering torque.

8. A motor-driven power steering control system including:
a stiffness torque determination unit configured to determine a column stiffness torque using torsional displacement of a column as a variable in a virtual steering system model including a model of the column connecting a steering wheel to a rack gear; and
a target steering torque determination unit configured to determine a target steering torque based on the determined column stiffness torque,
wherein the stiffness torque determination unit is configured to determine the column stiffness torque based on the torsional displacement of the column, and rates of change of the column stiffness torque with respect to the torsional displacement of the column in a plurality of sections, which are divided from each other based on amplitudes of the torsional displacement of the column, are set to be different.

9. The motor-driven power steering control system according to claim 8, further including a damping torque determination unit configured to determine a column damping torque using a change rate of the torsional displacement of the column as a variable,
wherein the target steering torque determination unit is configured to determine the target steering torque to be proportional to a sum of the determined column stiffness torque and the determined column damping torque.

10. The motor-driven power steering control system according to claim 8, further including a gain setting unit configured to set an assist gain using a speed of a vehicle as a variable,
wherein the target steering torque determination unit is configured to determine the target steering torque by reflecting the assist gain set by the gain setting unit.

11. The motor-driven power steering control system according to claim 8, further including a motor controller configured to control a steering motor using the target steering torque determined by the target steering torque determination unit.

12. A motor-driven power steering control system including a controller configured to:
determine a column stiffness torque using torsional displacement of a column as a variable in a virtual steering system model including a model of the column connecting a steering wheel to a rack gear; and
determine a target steering torque based on the determined column stiffness torque,
wherein the column stiffness torque is determined based on the torsional displacement of the column, and rates of change of the column stiffness torque with respect to the torsional displacement of the column in a plurality of sections, which are divided from each other based on amplitudes of the torsional displacement of the column, are set to be different.

13. The motor-driven power steering control system according to claim 12, wherein the controller is further configured to determine a column damping torque using a change rate of the torsional displacement of the column as a variable,
wherein the target steering torque is determined to be proportional to a sum of the determined column stiffness torque and the determined column damping torque.

14. The motor-driven power steering control system according to claim 12,
wherein the controller is further configured to set an assist gain using a speed of a vehicle as a variable, and
wherein the controller is further configured to determine the target steering torque by reflecting the assist gain.

15. The motor-driven power steering control system according to claim 12, wherein the controller is further configured to control a steering motor using the target steering torque.

* * * * *